United States Patent Office.

DAVID WRIGHT, OF BOSTON, MASSACHUSETTS.

Letters Patent No. 78,780, dated June 9, 1868.

IMPROVED COMPOSITION FOR GILDING MOULDINGS, &c.

*The Schedule referred to in these Letters Patent and making part of the same.*

TO WHOM IT MAY CONCERN:

Be it known that I, DAVID WRIGHT, of Boston, in the county of Suffolk, and State of Massachusetts, have invented a new Preparation or Compound for Preparing Frames, Mouldings, Ceilings, and all Surfaces for Gilding in Gold and Silver; and I hereby declare that the following is an exact description thereof.

My invention consists of china-chalk, borax, gum-arabic, and glue, dissolved in water, and forming a liquid compound.

The proportions of materials are as follows, viz: China-chalk, twenty-four ounces; borax, one ounce; gum-arabic, two ounces; glue, four ounces, with water sufficient to form a liquid compound of such consistence as may be desired.

What I claim as my invention, and desire to secure by Letters Patent, is—

The preparation or compound for preparing frames, mouldings, ceilings, and all surfaces, for gilding in gold and silver, substantially as set forth and described.

DAVID WRIGHT.

Witnesses:
W. D. FOSTER,
D. A. TITCOMB.